(12) United States Patent
Matsushiro et al.

(10) Patent No.: US 7,817,853 B2
(45) Date of Patent: Oct. 19, 2010

(54) IMAGE CONVERTING METHOD AND IMAGE CONVERTING APPARATUS

(75) Inventors: Nobuhito Matsushiro, Tokyo (JP); Noboru Ota, Odawara (JP)

(73) Assignee: Oki Data Corporation, Tokyo (JP)

( * ) Notice: Subject to any disclaimer, the term of this patent is extended or adjusted under 35 U.S.C. 154(b) by 43 days.

(21) Appl. No.: 12/405,570

(22) Filed: Mar. 17, 2009

(65) Prior Publication Data
US 2009/0196499 A1 Aug. 6, 2009

Related U.S. Application Data

(62) Division of application No. 10/702,534, filed on Nov. 5, 2003, now abandoned.

(30) Foreign Application Priority Data
Nov. 8, 2002 (JP) ............................. 2002-324752

(51) Int. Cl.
G06K 9/00 (2006.01)
(52) U.S. Cl. .................................................. 382/167
(58) Field of Classification Search .................. None
See application file for complete search history.

(56) References Cited

U.S. PATENT DOCUMENTS

| | | | |
|---|---|---|---|
| 5,414,811 A | 5/1995 | Parulski et al. | |
| 5,748,764 A * | 5/1998 | Benati et al. | 382/117 |
| 5,771,311 A | 6/1998 | Arai | |
| 5,828,780 A | 10/1998 | Suzuki et al. | |
| 6,023,524 A * | 2/2000 | Yamaguchi | 382/162 |
| 6,130,675 A | 10/2000 | Murai et al. | |
| 6,330,076 B1 | 12/2001 | Imaizumi et al. | |
| 6,340,976 B1 | 1/2002 | Oguchi et al. | |
| 6,650,772 B1 * | 11/2003 | Inoue et al. | 382/162 |
| 6,775,408 B1 * | 8/2004 | Masaki | 382/167 |
| 6,870,567 B2 | 3/2005 | Funston et al. | |
| 6,873,727 B2 | 3/2005 | Lopez et al. | |
| 6,947,079 B2 | 9/2005 | Parulski et al. | |
| 7,015,955 B2 | 3/2006 | Funston et al. | |
| 7,227,586 B2 | 6/2007 | Finlayson et al. | |

FOREIGN PATENT DOCUMENTS

| | | |
|---|---|---|
| JP | 9-009069 A | 1/1997 |
| JP | 2002-232901 A | 8/2002 |
| JP | 11-252391 | 10/2008 |

OTHER PUBLICATIONS

Graham Finlayson et al, "Improving Gamut Mapping Color Constancy", IEEE Trans. Image Processing, vol. 9, pp. 1174-1783, (2000).
G.D. Finlayson, "Color in Perspective", IEEE Trans. Pattern Analysis and Machine Intelligence, vol. 8, No. 10, pp. 1034-1038, (1996).

* cited by examiner

*Primary Examiner*—Yuzhen Ge
(74) *Attorney, Agent, or Firm*—Panitch Schwarze Belisario & Nadel LLP (57) ABSTRACT

An image converting method includes the steps of: converting each pixel of an input image into 2-dimensional conversion chromaticity coordinate values which are obtained by projecting conversion chromaticity coordinate values obtained by converting each of said pixels by using parameters for converting in chromaticity coordinates onto a unit plane, and obtaining parameter values in which a barycenter of a color region including the 2-dimensional conversion chromaticity coordinate values are set to ⅓; and converting the input image by the obtained parameter values.

4 Claims, 8 Drawing Sheets

IMAGE CONVERTING METHOD AND IMAGE CONVERTING APPARATUS

CROSS-REFERENCE TO RELATED APPLICATIONS

This application is a Divisional of U.S. patent application Ser. No. 10/702,534, filed Nov. 5, 2003, the disclosure of which is incorporated herein by reference.

BACKGROUND OF THE INVENTION

The invention relates to an image converting method and an image converting apparatus for converting image data influenced by a colored light source upon photographing into image data obtained under an ideal white light source.

When an object to be photographed is photographed by using, for example, a fluorescent lamp as a light source, image data in which the object is bluish is obtained. An image converting method called a gray world (hereinafter, simply referred to as a gray world) is used to eliminate such an influence of the colored light source.

Figure 6:
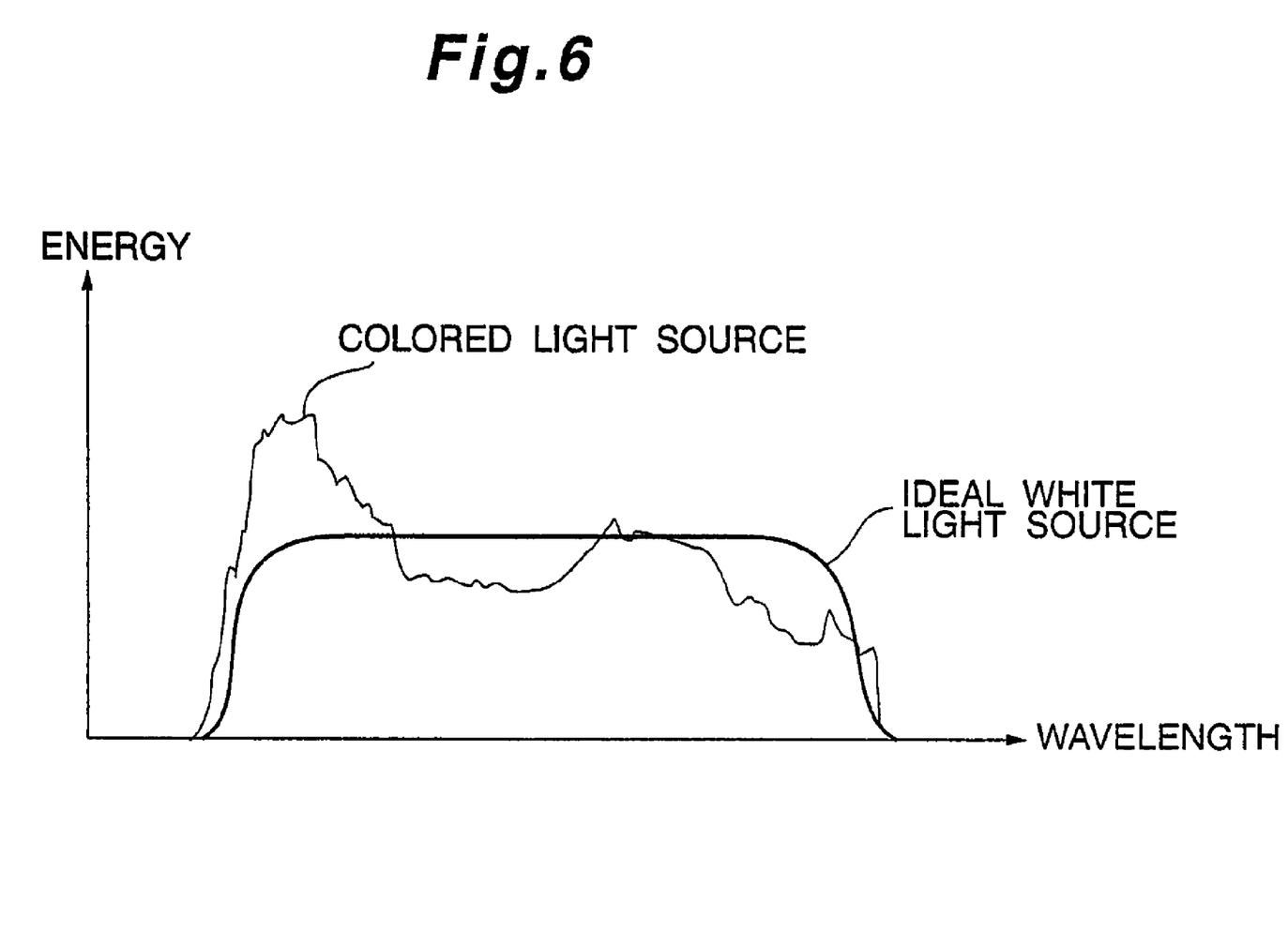
FIG. 6 is a diagram showing spectral distribution of an ideal white light source.

According to the gray world, it is presumed that a color obtained by averaging chromaticity coordinate values of respective pixels of the image data becomes chromaticity coordinate values showing achromatic gray, and by converting the image data by using such chromaticity coordinate values showing the achromatic gray, that is, by executing what is called a chromatic adaptation conversion, bluishness is eliminated. That is, the gray world is a method of obtaining the same image data as that photographed under an ideal white light source in which spectra are uniformed as shown in FIG. 6. A technique using the gray world has been disclosed in a patent literature 1 (JP-A-2002-232901).

According to the conventional gray world, the conversion is performed to the image data by using the chromaticity coordinate values obtained by averaging the chromaticity coordinate values of the respective pixels. That is, the averaging of the chromaticity coordinate values of the respective pixels is performed to obtain average values of the chromaticity coordinate values which take into consideration of a frequency of occurrence of the color of each pixel. Therefore, average values of chromaticity coordinate values of image data obtained by photographing, for example, a small white sandy beach, a blue sea, and a blue sky, as objects, by using a digital camera or the like are not chromaticity coordinate values showing the achromatic gray but chromaticity coordinate values which are deviated to blue and based on blue. Therefore, even if the conversion is executed by using those chromaticity coordinate values, the image data cannot be properly converted into the image data which is obtained under the ideal white light source.

BRIEF SUMMARY OF THE INVENTION

It is, therefore, an object of the invention to provide an image converting method and an image converting apparatus which can convert image data whose photographed object is unbalanced in color arrangement into the image data which is obtained under an ideal white light source.

According to the first aspect of the invention, to accomplish the above object, there is provided an image converting method comprising the steps of: converting chromaticity coordinate values which each pixel of an input image consisting of a plurality of pixels has into a 2-dimensional chromaticity coordinate plane and obtaining 2-dimensional conversion chromaticity coordinate values of each pixel; obtaining an outline of a color region defined by the 2-dimensional conversion chromaticity coordinate values of the plurality of pixels converted into the 2-dimensional chromaticity coordinate plane; obtaining 2-dimensional conversion chromaticity coordinate values, on a 2-dimensional chromaticity coordinate plane, of a barycenter of an area of a region which is specified by the outline of the color region; and executing a color conversion of the input image by using the 2-dimensional conversion chromaticity coordinate values of the barycenter as a new coordinate origin.

Each pixel of an input image is converted into 2-dimensional conversion chromaticity coordinate values obtained by projecting conversion chromaticity coordinate values obtained by converting each pixel by using parameters for converting into chromaticity coordinate values onto a unit plane, in a color region including the 2-dimensional conversion chromaticity coordinate values, parameter values in which an area of the color region becomes the maximum are obtained, and the input image is converted by the obtained parameter values.

Each pixel of an input image is converted into 2-dimensional conversion chromaticity coordinate values obtained by projecting conversion chromaticity coordinate values obtained by converting each pixel by using parameters for converting into chromaticity coordinate values onto a unit plane, parameter values in which a barycenter of a color region including the 2-dimensional conversion chromaticity coordinate values is set to ⅓ are obtained, and the input image is converted by the obtained parameter values.

The parameter values can be obtained when the barycenter lies within a predetermined threshold value including ⅓.

According to the second aspect of the invention, there is provided an image converting apparatus comprising: a parameter setting unit which sets parameters for converting each pixel of an input image into predetermined chromaticity coordinate values; a chromaticity coordinate converting unit which obtains conversion chromaticity coordinate values obtained by converting each of the pixels on the basis of the parameters set by the parameter setting unit; a color region obtaining unit which obtains a color region including 2-dimensional conversion chromaticity coordinate values obtained by projecting each of the conversion chromaticity coordinate values onto a unit plane; an area calculation processing unit which calculates an area of the color region with respect to the parameters and obtains parameter values at the time when the calculated area value becomes the maximum; and an image converting unit which converts the input image on the basis of the obtained parameter values.

According to the third aspect of the invention, there is provided an image converting apparatus comprising: a parameter setting unit which sets parameters for converting each pixel of an input image into predetermined chromaticity coordinate values; a chromaticity coordinate converting unit which obtains conversion chromaticity coordinate values obtained by converting each of the pixels on the basis of the parameters set by the parameter setting unit; a color region obtaining unit which obtains a color region including 2-dimensional conversion chromaticity coordinate values obtained by projecting each of the conversion chromaticity coordinate values onto a unit plane so that additive color mixture can be performed; a barycenter calculation processing unit which calculates a barycenter of the color region with respect to the parameters and obtains parameter values at the time when the calculated barycenter is set to ⅓; and an image converting unit which converts the input image on the basis of the obtained parameter values.

The barycenter calculation processing unit can obtain the parameter values at the time when the barycenter lies within a predetermined threshold value including ⅓.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
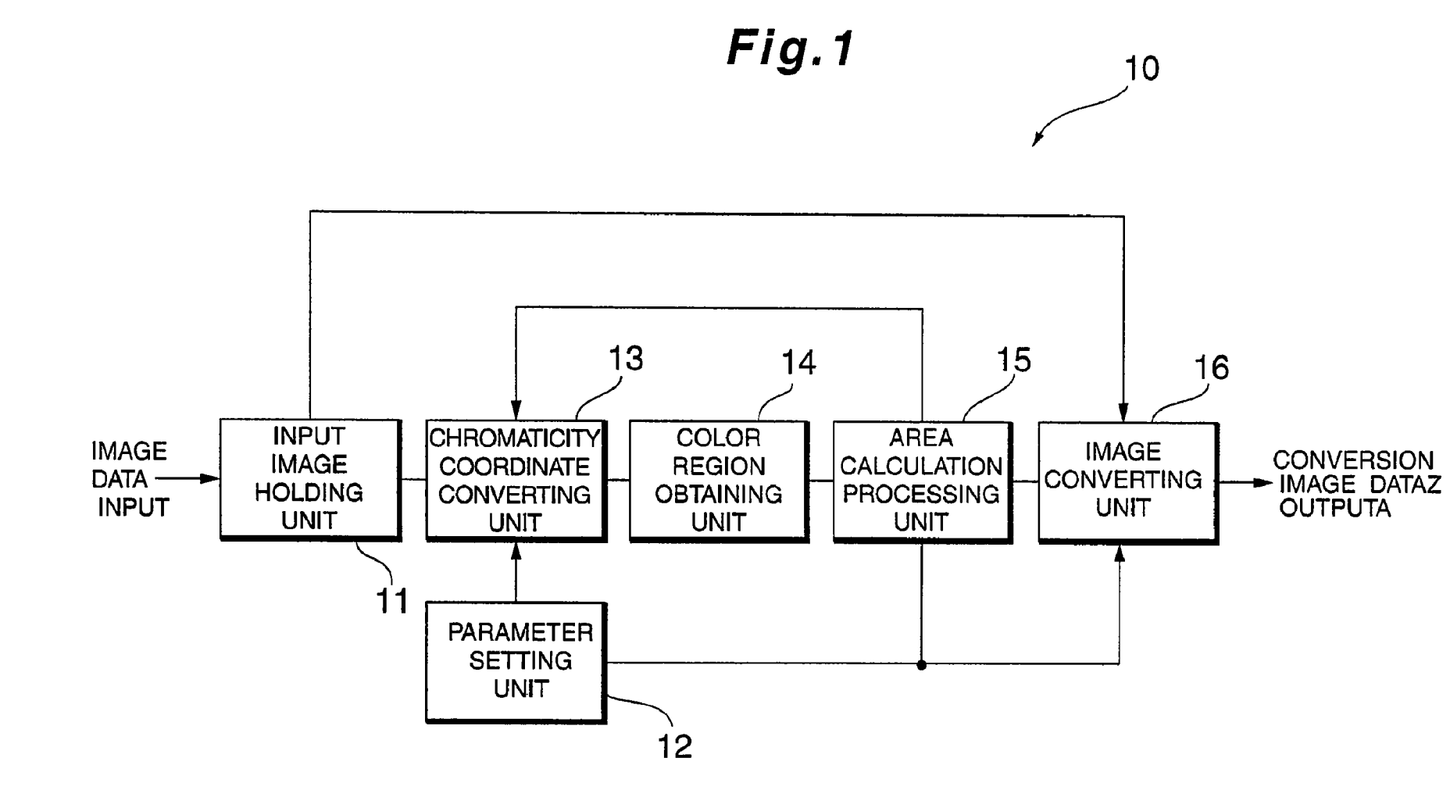
FIG. 1 is a block diagram of an image converting apparatus according to an embodiment 1.

FIG. 1 is a block diagram of an image converting apparatus 10 according to an embodiment 1.

The image converting apparatus 10 comprises: an input image holding unit 11 which holds an input image, that is, image data to be converted; a parameter setting unit 12 which sets predetermined parameters for converting the image data held in the input image holding unit 11; a chromaticity coordinate converting unit 13 which obtains conversion chromaticity coordinate values by converting chromaticity coordinate values showing a color of each pixel of the image data on the basis of the parameters set by the parameter setting unit 12; a color region obtaining unit 14 which obtains a region, as a color region, including 2-dimensional conversion chromaticity coordinate values, in a convex polygonal shape, obtained by projecting the conversion chromaticity coordinate values formed by the chromaticity coordinate converting unit 13 onto a unit plane so that additive color mixture can be performed; an area calculation processing unit 15 which calculates an area of the color region obtained by the color region obtaining unit 14 and obtains parameter values at the time when the calculated area becomes the maximum; and an image converting unit 16 which converts the input image data by using the parameter values obtained by the area calculation processing unit 15.

Subsequently, each unit will be explained.

The input image holding unit 11 holds image data of an object photographed by a digital camera or the like. The image data is constructed by a plurality of pixels and each pixel is shown by the RGB calorimetric system which has conventionally been known.

The parameter setting unit 12 performs a conversion from (R, G, B) values of the pixel on a pixel unit basis of the image data held in the input image holding unit 11 by using coefficients ($\rho$, $\gamma$, $\beta$) of three channels as parameter values. Values of $\rho$, $\gamma$, and $\beta$ are changed at predetermined sampling intervals within ranges of $0<\rho<\rho_{max}$, $0<\gamma<\gamma_{max}$, and $0<\beta<\beta_{max}$, respectively.

For example, 0.05 unit is used as a sampling interval and 2 is used as values of $\rho_{max}$, $\gamma_{max}$, and $\beta_{max}$. The narrower the sampling interval is and the larger the values of $\rho_{max}$, $\gamma_{max}$, and $\beta_{max}$ are set, the larger an amount of arithmetic operating processes, which will be explained hereinlater, increases. Therefore, it is preferable to properly set them in accordance with arithmetic operating processing ability.

Results obtained by executing a conversion of chromaticity coordinate values (R, G, B) of each pixel on the basis of the parameters ($\rho$, $\gamma$, $\beta$) are assumed to be conversion chromaticity coordinate values (R', G', B') and their relations are shown by the following equations (1).

$$R' = \rho \cdot R$$

$$G' = \gamma \cdot G$$

$$B' = \beta \cdot B \quad (1)$$

When the conversion chromaticity coordinate values (R', G', B') are received from the chromaticity coordinate converting unit 13, the color region obtaining unit 14 executes a conversion shown by the following equations (2) in order to show the conversion chromaticity coordinate values (R', G', B') onto a unit plane shown by a relation (R+G+B=1).

$$r' = R'/(R'+G'+B')$$

$$g' = G'/(R'+G'+B')$$

$$b' = B'/(R'+G'+B') \quad (2)$$

Figure 2:
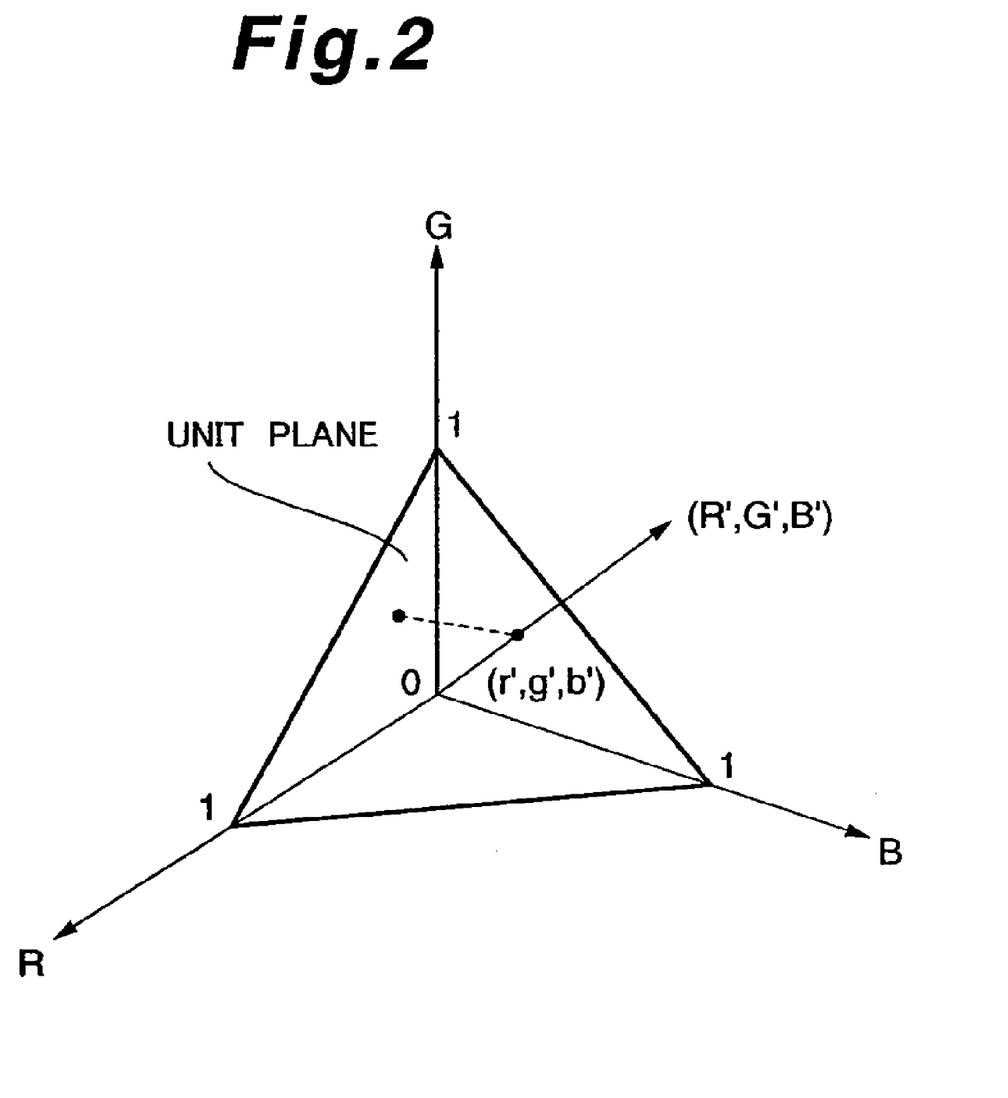
FIG. 2 is a diagram showing conversion chromaticity coordinate values (R', G', B')

The relations between (r', g', b') obtained by the above conversion and the conversion chromaticity coordinate values (R', G', B') are shown in FIG. 2 in which RGB are assumed to be coordinate axes.

Figure 3:
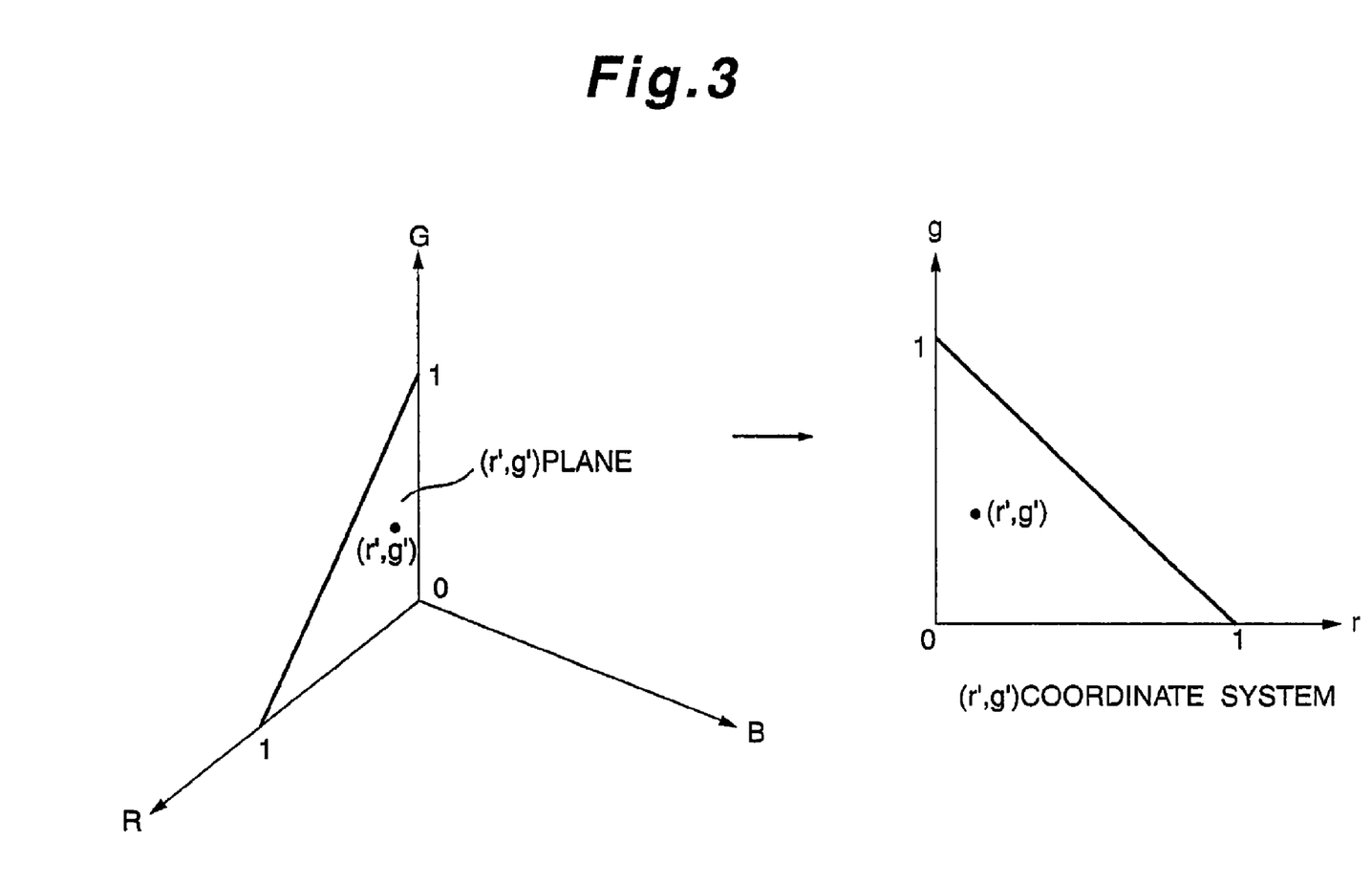
FIG. 3 is a diagram showing 2-dimensional conversion chromaticity coordinate values (r', g')

Further, 2-dimensional conversion chromaticity coordinate values (r', g') in which the obtained (r', g', b') are projected onto a 2-dimensional plane (2-dimensional chromaticity coordinate plane) are obtained. As shown in FIG. 3, the 2-dimensional conversion chromaticity coordinate values (r', g') are projected onto a (r, g) plane shown by an R axis and a G axis. The (r, g) plane is shown by an r axis and a g axis. An explanation will be made hereinbelow on the assumption that the 2-dimensional conversion chromaticity coordinate values (r', g') are shown on such an rg coordinate system.

Figure 4:
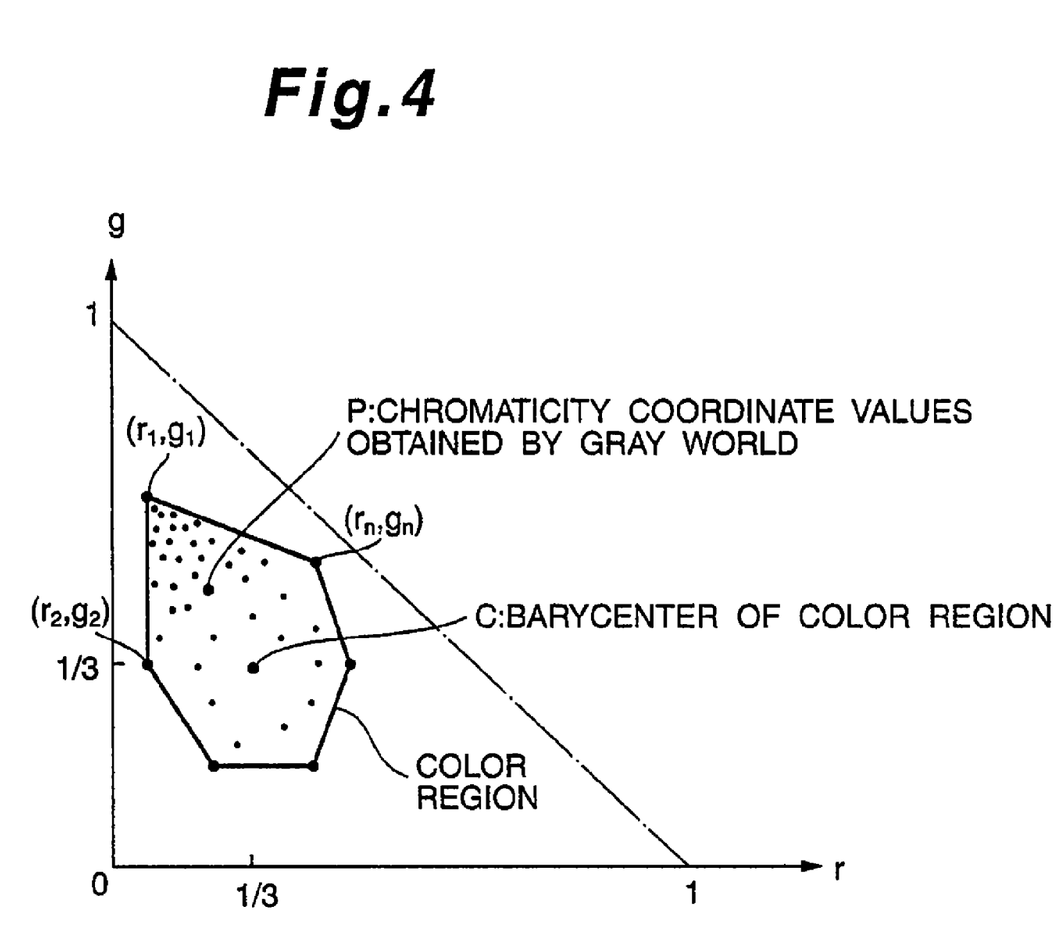
FIG. 4 is a diagram showing a color region.

When the 2-dimensional conversion chromaticity coordinate values (r', g') corresponding to all pixels are obtained, as shown in FIG. 4, the color region obtaining unit 14 obtains a region, as a color region, where an outermost shell of the 2-dimensional conversion chromaticity coordinate values (r', g') is surrounded by an outline showing a convex polygon (n-angled polygon) in order to include the 2-dimensional conversion chromaticity coordinate values (r', g') so that additive color mixture can be performed.

The color region obtained by the color region obtaining unit 14 shows a color gamut which can be expressed by the image data to which the conversion has been made by using the parameters. In the converted image data, therefore, the color region shows a color gamut of the colors which are used in the image data. Even in the image data of an object which is unbalanced in color arrangement, for example, a bluish object to be photographed, the blue color is not particularly reflected to the image data but the color region simply shows a color gamut of the colors which are used in the image data.

After the color region is obtained, the area calculation processing unit 15 obtains an area of the color region. The area of the color region is shown by the following equation (3).

$$S = \frac{1}{2}\left[\left|\begin{matrix} r'_1 & g'_1 \\ r'_2 & g'_2 \end{matrix}\right| + \left|\begin{matrix} r'_2 & g'_2 \\ r'_3 & g'_3 \end{matrix}\right| + \ldots + \left|\begin{matrix} r'_n & g'_n \\ r'_1 & g'_1 \end{matrix}\right|\right] \quad (3)$$

where, n: the number of vertices of a polygon showing the color region

The area of the color region is calculated by using the following equation (4) obtained by further converting the equation (3).

$$S = \frac{1}{2}\sum_{i=1}^{n} \frac{\rho \cdot r'_i + \gamma \cdot g'_{i+1} - \rho \cdot r'_{i+1} + \gamma \cdot g'_i}{(\rho \cdot r'_i + \gamma \cdot g'_i + \beta \cdot b'_i)(\rho \cdot r'_{i+1} + \gamma \cdot g'_{i+1} + \beta \cdot b'_{i+1})} \quad (4)$$

If the calculated area is larger than an area held in a storing unit (not shown), the area calculation processing unit 15 holds the calculated area into the storing unit. Such a series of processes is repeated for each of the various parameters set by the parameter setting unit 12. Therefore, areas of the color regions corresponding to all of the parameters are calculated and the maximum value of the calculated areas of the color regions is held in the storing unit. At this time, together with the maximum value, the parameter values ($\rho$, $\gamma$, $\beta$) corresponding to the color region of the maximum area are held in the storing unit.

When the area value is calculated for the first time, since the area value to be compared with is not held in the storing unit, the area calculation processing unit 15 holds the area value of the color region and the parameter values ($\rho$, $\gamma$, $\beta$) set by the parameter setting unit 12 into the storing unit without making the comparison of the area values.

Since the color region shows the color gamut which can be expressed by the image data to which the conversion has been made by using the parameters as mentioned above, if the area of the color region is large, the color gamut which can be expressed by the image data is widened. Therefore, in image data obtained by photographing an object under, for example, a reddish light source serving as a colored light source shown in FIG. 6, the color gamut which can be expressed is narrowed due to reddishness. However, in image data obtained by photographing an object under the ideal white light source, since it is not influenced by a hue of the colored light source, the color gamut which can be expressed, that is, the area of the color region is widened.

Further, the color region is not much influenced by the color arrangement balance of the object. The parameter values ($\rho$, $\gamma$, $\beta$) obtained on the basis of the area of the color region are not directly influenced by the color arrangement balance of the object either.

The image converting unit 16 executes a conversion to the image data held in the input image holding unit 11 by using the parameter values ($\rho$, $\gamma$, $\beta$) held in the storing unit mentioned above, that is, the parameter values in which the area of the color region becomes the maximum. Owing to such a conversion, the image data is converted to obtain a state as if the object were photographed under the ideal white light source.

Figure 5:
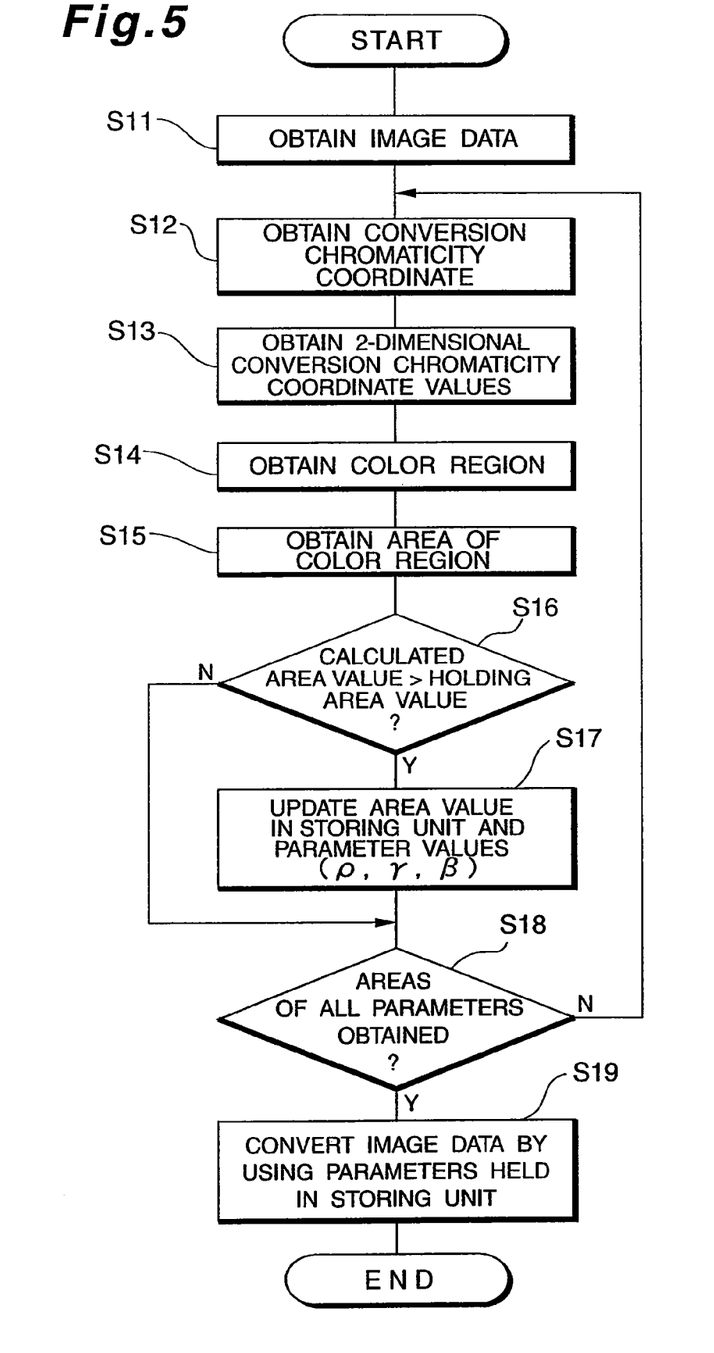
FIG. 5 is a flowchart showing the operation of the image converting apparatus according to the embodiment 1.

Subsequently, the operation of the image converting apparatus 10 of the invention will be described with reference to a flowchart of FIG. 5.

Image data of an object photographed by a digital camera or the like is obtained as an input image and held in the input image holding unit 11 (step S11).

The chromaticity coordinate converting unit 13 executes a conversion to the chromaticity coordinate values (R, G, B) of each pixel of the image data held in the input image holding unit 11 by using the parameters ($\rho$, $\gamma$, $\beta$) set by the parameter setting unit 12, thereby obtaining the conversion chromaticity coordinate values (R', G', B') (step S12).

After the conversion chromaticity coordinate values (R', G', B') are obtained, the color region obtaining unit 14 projects the conversion chromaticity coordinate values (R', G', B') onto the (r, g) plane as a unit plane, thereby obtaining the 2-dimensional conversion chromaticity coordinate values (r', g') (step S13).

Further, the color region obtaining unit 14 obtains a convex polygonal region, as a color region, including the 2-dimensional conversion chromaticity coordinate values (r', g') plotted onto the (r, g) plane so that additive color mixture can be performed (step S14).

After the color region is obtained, the area of the color region is calculated by the area calculation processing unit 15 by using the equation (4) (step S15).

The area calculation processing unit 15 compares the calculated area with the area value held in the storing unit not shown in FIG. 1 (step S16).

By this comparison, if the area calculated this time is larger than the area value held in the storing unit, contents in the storing unit are updated on the basis of the area value of the color region calculated this time and the parameter values corresponding to the color region (step S17). Therefore, the storing unit holds the area value of the maximum color region among the area values of the color regions obtained with respect to the various parameters and the parameter values which correspond to such an area value and were used when the conversion is performed to the image data by the chromaticity coordinate converting unit 13.

On the other hand, if the area calculated this time is equal to or smaller than the area value held in the storing unit, the area calculation processing unit 15 executes a process in step S18 without updating the contents held in the storing unit.

In the process in step S18, whether the comparison between the area of each color region obtained every parameter and the value held in the storing unit has been finished or not is discriminated. That is, the parameters ($\rho$, $\gamma$, $\beta$) are changed at predetermined sampling intervals within the ranges of $0 < \rho < \rho_{max}$, $0 < \gamma < \gamma_{max}$, and $0 < \beta < \beta_{max}$, respectively, and in the color regions in all of the changed parameters, whether the maximum area value among the color regions has completely been obtained or not is discriminated (step S18).

As a result of the discrimination, if the processes for obtaining and comparing the area values of the color regions are not finished yet with respect to all of the parameters, the processing routine is returned to the process in step S11. The parameters ($\rho$, $\gamma$, $\beta$) are changed at the predetermined sampling intervals by the parameter setting unit 12 and the processes are executed in a manner similar to those mentioned above.

After the maximum area value is obtained, the image converting unit 16 executes a conversion to the image data held in the input image holding unit 11 by using the parameter values corresponding to the color region of the maximum area value held in the storing unit.

According to the image converting apparatus 10 of the invention, therefore, by obtaining the parameter values ($\rho$, $\gamma$, $\beta$) in which the area of the color region becomes the maximum and executing the conversion to the image data by using the obtained parameter values (ρ, γ, β), the image data in which the color gamut which is expressed is narrowed due to the influence of the colored light source can be converted into the image data in which the color gamut which is expressed becomes widest, that is, the image data obtained under the ideal white light source.

Further, according to the image converting apparatus 10 of the invention, the parameter values (ρ, γ, β) are obtained on the basis of the area of the color region showing the color gamut which can be expressed by the image data to be converted without being directly influenced by the color arrangement balance of the object. Therefore, a drawback such that the image data is influenced by the degrees of the chromaticity coordinate values of each pixel of the image data to be converted as in the case of the conventional gray world is eliminated. Thus, the image conversion can be properly executed even to the image data obtained by photographing the object which is unbalanced in color arrangement.

As mentioned above, in the conventional gray world, the correction is made by using the average values of the chromaticity coordinate values of each pixel of the image data. Therefore, since the frequency of occurrence of the expressing color is considered, the image data obtained by photographing the object which is unbalanced in color arrangement cannot be properly corrected. In the color region as a feature of the invention, the frequency of occurrence of the expressing color is not considered but the color region shows the color gamut expressed in the image data. Therefore, since the foregoing degrees are not reflected to such a color region, the degrees are not reflected to a barycenter of the color region either.

According to the embodiment 2, parameters in which the barycenter of the color region to which the degrees are not reflected is set to ⅓ are obtained.

Figure 7:
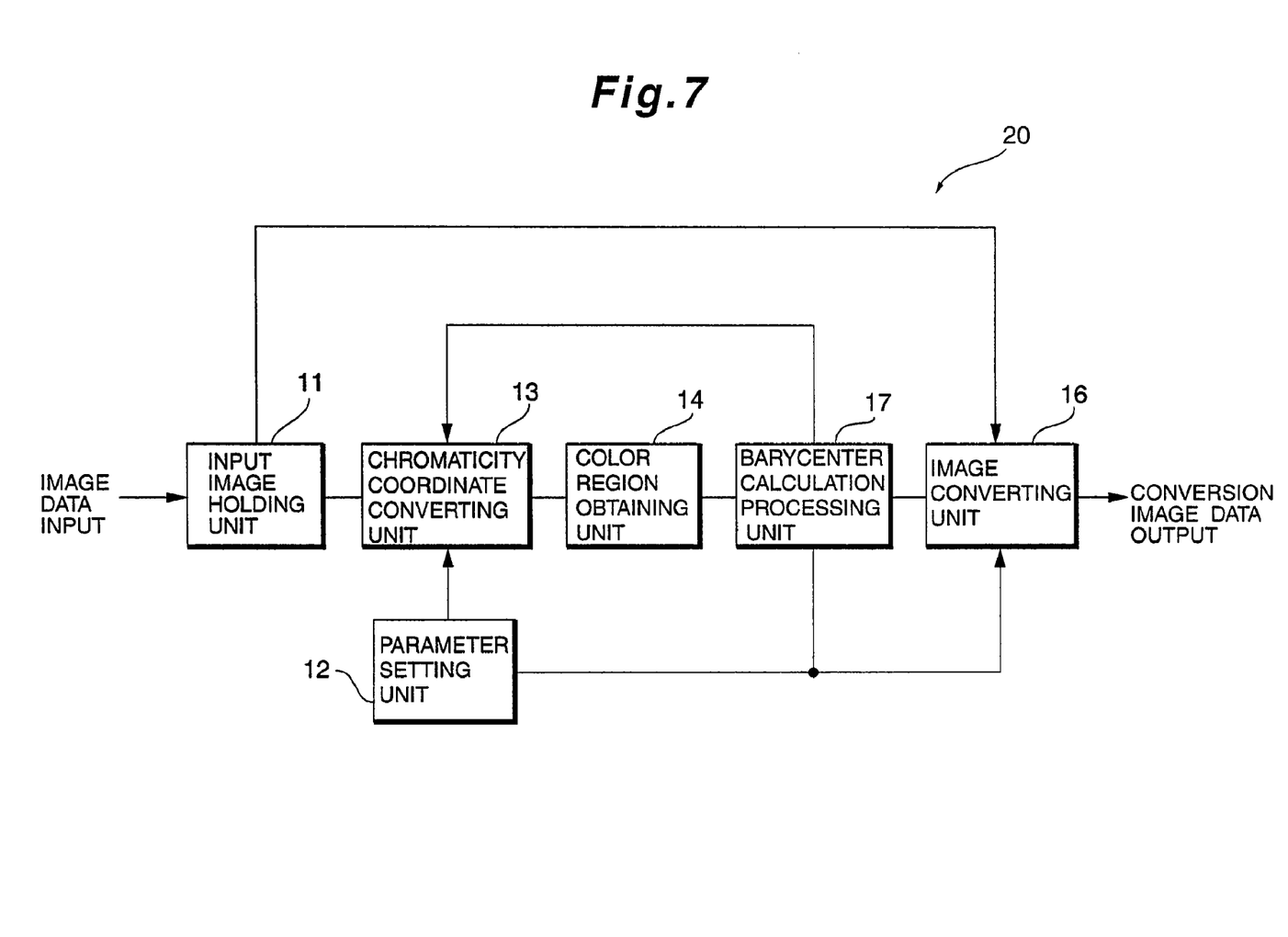
FIG. 7 is a block diagram of an image converting apparatus according to an embodiment 2.

FIG. 7 is a block diagram of an image converting apparatus 20 according to the embodiment 2.

The image converting apparatus 20 of the embodiment 2 has a construction using a barycenter calculation processing unit 17 in place of the area calculation processing unit 15 in the embodiment 1.

The image converting apparatus 20 comprises: the input image holding unit 11 which holds the image data to be converted; the parameter setting unit 12 which sets the various parameters (ρ, γ, β) for executing the conversion to the image data held in the input image holding unit 11; the chromaticity coordinate converting unit 13 which obtains the conversion chromaticity coordinate values (R', G', B') by converting the chromaticity coordinate values showing the color of each pixel of the image data on the basis of the parameters set by the parameter setting unit 12; the color region obtaining unit 14 which obtains a region, as a color region, including the 2-dimensional conversion chromaticity coordinate values (r', g'), in a convex polygonal shape, obtained by projecting the conversion chromaticity coordinate values formed by the chromaticity coordinate converting unit 13 onto the unit plane so that the additive color mixture can be performed; the barycenter calculation processing unit 17 which calculates the barycenter of the color region obtained by the color region obtaining unit 14 and obtains parameter values at the time when the calculated barycenter lies within a predetermined threshold value including ⅓; and the image converting unit 16 which converts the image data by using the parameter values obtained by the barycenter calculation processing unit 17.

Since the input image holding unit 11, parameter setting unit 12, chromaticity coordinate converting unit 13, color region obtaining unit 14, and image converting unit 16 are the same as those in the embodiment 1 mentioned above, their description is omitted here.

The barycenter calculation processing unit 17 obtains the parameters (ρ, γ, β) at the time when the barycenter of the color region obtained by the color region obtaining unit 14 lies within the predetermined threshold value including ⅓. The image data obtained under the ideal white light source can be obtained by converting the image data by using the obtained parameters as will be explained by using equations.

In the color region shown in FIG. 4, although the area of the color region influenced by the colored light source is narrowed, since the image data obtained by photographing the object under the ideal white light source is not influenced by the hue of the colored light source, the color gamut which is expressed, that is, the color region becomes the maximum. The parameter values (ρ, γ, β) of a relation shown in the following equation (5) are obtained in order to maximize an area S of the color region.

$$\partial S/\partial \rho = \partial S/\partial \gamma = \partial S/\partial \beta = 0 \tag{5}$$

First, a partial differentiation of the area S shown in the equation (4) is executed with respect to ρ and γ, thereby obtaining the following equations (6) and (7).

$$\frac{\partial S}{\partial \rho} = \frac{1}{2}\sum_{i=1}^{n} \frac{(1 - r'_i - r'_{i+1})(r'_i \cdot g'_{i+1} - r'_{r+1} \cdot g'_i)}{\rho} \tag{6}$$

$$\frac{\partial S}{\partial \gamma} = \frac{1}{2}\sum_{i=1}^{n} \frac{(1 - g'_i - g'_{i+1})(r'_i \cdot g'_{i+1} - r'_{i+1} \cdot g'_i)}{\gamma} \tag{7}$$

where, n: the number of vertices of the polygon showing the color region

The equations (6) and (7) indicate the extremal parameter values (ρ and γ) at the time when the area is maximized, respectively. When $\partial S/\partial \rho = 0$ and $\partial S/\partial \gamma = 0$ are satisfied, a sum of numerators of the equations (6) and (7) is equal to 0. Thus, the following equations (8) and (9) are obtained by rearranging the equations (6) and (7).

$$\sum_{i=1}^{n}(r'_i + r'_{i+1})(r'_i \cdot g'_{i+1} - r'_{i+1} \cdot g'_i) = \sum_{i=1}^{n}(r'_i \cdot g'_{i+1} - r'_{i+1} \cdot g'_i) \tag{8}$$

$$\sum_{i=1}^{n}(g'_i + g'_{i+1})(r'_i \cdot g'_{i+1} - r'_{i+1} \cdot g'_i) = \sum_{i=1}^{n}(r'_i \cdot g'_{i+1} - r'_{i+1} \cdot g'_i) \tag{9}$$

According to the equation (3), a right side of each of the equations (8) and (9) indicates a double area of the color region. Therefore, the equations (8) and (9) are simplified to the following equations (10) and (11).

$$\sum_{i=1}^{n}(r'_i + r'_{i+1})(r'_i \cdot g'_{i+1} - r'_{i+1} \cdot g'_i) = 2 \cdot S \tag{10}$$

$$\sum_{i=1}^{n}(g'_i + g'_{i+1})(r'_i \cdot g'_{i+1} - r'_{i+1} \cdot g'_i) = 2 \cdot S \tag{11}$$

Coordinate values showing the barycenter of the color region are shown by the following equations (12) and (13).

$$r'_c = \frac{1}{6} \frac{\sum_{i=1}^{n}(r'_i + r'_{i+1})(r'_i \cdot g'_{i+1} - r'_{i+1} \cdot g'_i)}{S} \quad (12)$$

$$g'_c = \frac{1}{6} \frac{\sum_{i=1}^{n}(g'_i + g'_{i+1})(r'_i \cdot g'_{i+1} - r'_{i+1} \cdot g'_i)}{S} \quad (13)$$

By substituting the equation (10) into the equation (12), the following equation (14) is obtained and by substituting the equation (11) into the equation (13), the following equation (15) is obtained.

$$r'_c = 1/3 \quad (14)$$

$$g'_c = 1/3 \quad (15)$$

A barycenter ($r'_c$, $g'_c$) of the color region whose area is maximized is set to 1/3.

On the other hand, as is known hitherto, when the colors of R, G, and B each having an equal amount are mixed (additive color mixture), a white color is shown. In the above color mixture, if the colors of R, G, and B of the maximum values of the equal amount (R=G=B) are mixed so as not to cause a spot in spectral distribution (that is, so as to obtain flat spectral distribution), an ideal white light source is obtained. In such an ideal white light source called a flat white light source, since the colors of R, G, and B of the equal amount are uniformly mixed, a relation shown by the following equations (16) is satisfied.

$$R/(R+G+B)=1/3$$

$$G/(R+G+B)=1/3$$

$$B/(R+G+B)=1/3 \quad (16)$$

When the relation shown by the equations (16) is shown by coordinates on a unit plane of (R+G+B=1), each value of R, G, and B indicates 1/3 and it coincides with the barycenter of the color region mentioned above. In other words, the barycenter of the color region of the ideal white light source is also set to 1/3.

FIG. 4 shows a barycenter (C) of the color region mentioned above. FIG. 4 also shows chromaticity coordinate values P obtained by the conventional gray world. The chromaticity coordinate values of each pixel are shown by a dot in the color region shown in FIG. 4. According to the gray world which takes into consideration of the frequency of occurrence of the chromaticity coordinate values of each pixel, in the image data having a deviation of each dot (chromaticity coordinate values of each pixel) shown in FIG. 4, that is, the image data obtained by photographing the object which is unbalanced in color arrangement, the coordinate values P which are away from the coordinate values C indicative of the barycenter of the color region of the ideal white light source are shown.

Figure 8:
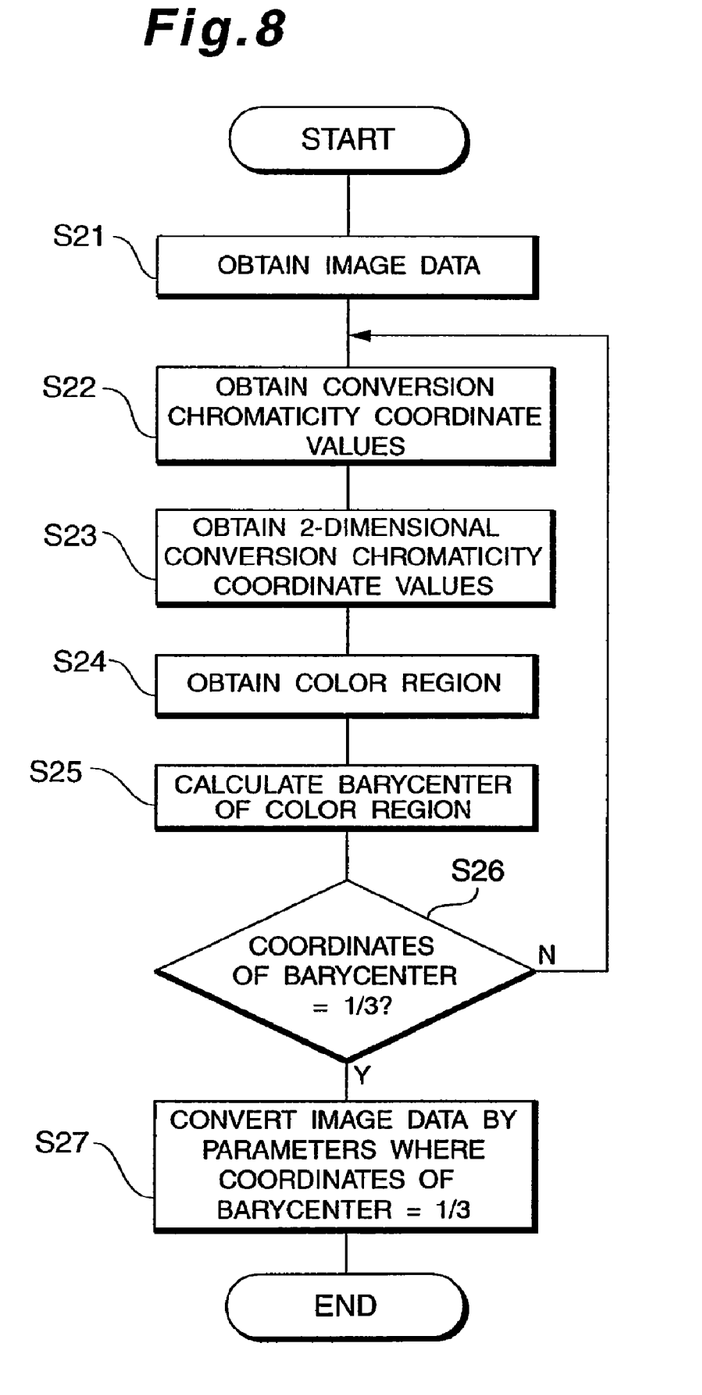
FIG. 8 is a flowchart showing the operation of the image converting apparatus according to the embodiment 2.

Subsequently, the operation of the image converting apparatus 20 of the embodiment 2 will be described with reference to a flowchart of FIG. 8.

Image data of an object photographed by a digital camera or the like is obtained as an input image and held in the input image holding unit 11 (step S21).

The chromaticity coordinate converting unit 13 executes a conversion to the chromaticity coordinate values (R, G, B) of each pixel of the image data held in the input image holding unit 11 by using the parameters ($\rho$, $\gamma$, $\beta$) set by the parameter setting unit 12, thereby obtaining the conversion chromaticity coordinate values (R', G', B') (step S22).

After the conversion chromaticity coordinate values (R', G', B') are obtained, the color region obtaining unit 14 projects the conversion chromaticity coordinate values (R', G', B') onto the (r, g) plane as a unit plane, thereby obtaining the 2-dimensional conversion chromaticity coordinate values (r', g') (step S23).

Further, the color region obtaining unit 14 obtains a convex polygonal region, as a color region, where the 2-dimensional conversion chromaticity coordinate values (r', g') plotted onto the (r, g) plane are included so that additive color mixture can be performed (step S24).

After the color region is obtained, coordinates of the barycenter of the color region is calculated by the barycenter calculation processing unit 17 by using the above equations (step S25).

Further, the barycenter calculation processing unit 17 discriminates whether the calculated coordinates of the barycenter lie within a predetermined threshold value or not as shown by the following inequalities (17) (step S26).

$$|r'_c - 1/3| < \epsilon_r$$

$$|g'_c - 1/3| < \epsilon_g \quad (17)$$

where, $\epsilon_r$: threshold value of the r coordinate $\epsilon_g$: threshold value of the g coordinate At this time, the barycenter calculation processing unit 17 obtains the parameter values ($\rho$, $\gamma$, $\beta$) set by the parameter setting unit 12.

By this discrimination, if the calculated coordinates of the barycenter are out of the range shown by the inequalities (17), the processing routine is returned to the process in step S21. The parameters ($\rho$, $\gamma$, $\beta$) are changed at predetermined sampling intervals by the parameter setting unit 12 and the above processes are similarly executed.

If the calculated coordinates of the barycenter of the color region are within the range shown by the inequalities (17), the image converting unit 16 executes a conversion to the image data held in the input image holding unit 11 by using the parameter values corresponding to the color region where the barycenter lies within the predetermined threshold value including 1/3, that is, the parameter values ($\rho$, $\gamma$, $\beta$) obtained from the parameter setting unit 12 in step S26. Thus, the coordinate values showing the barycenter of the color region are set to a new coordinate origin and the conversion is executed to the input image.

As mentioned above, according to the image converting apparatus 20 of the invention, the parameter values ($\rho$, $\gamma$, $\beta$) in which the barycenter at the time when the area of the color region showing the color gamut of the image data to be converted is maximized lies within the predetermined threshold value including 1/3 are obtained and the conversion is performed to the image data by using the obtained parameter values ($\rho$, $\gamma$, $\beta$). Therefore, since the degrees of the chromaticity coordinate values of each pixel of the image data are not considered, even the image data obtained by photographing the object which is unbalanced in color arrangement can be converted into the image data obtained by photographing the object under the ideal white light source.

In the foregoing embodiments, the convex polygonal color region including the 2-dimensional conversion chromaticity coordinate values (r', g') is obtained every parameters ($\rho$, $\gamma$, $\beta$) which are set to various values so that the additive color mixture can be performed. However, it is also possible that initial states of the parameters ($\rho$, $\gamma$, $\beta$) are assumed to be $\rho=1$, $\gamma=1$, and $\beta=1$, coordinate values of each vertex of the color region in those parameters are obtained, a vertex coordinate holding unit for holding those coordinate values is provided, and the arithmetic operations which have conventionally been known are executed by using the obtained coordinate values in the initial states. Thus, the arithmetic operating processes for converting the image data by using the parameters every various parameters ($\rho$, $\gamma$, $\beta$) and obtaining the color region where the converted chromaticity coordinate values are projected onto the unit plane can be omitted.

As mentioned above, in the color region including the 2-dimensional conversion chromaticity coordinate values obtained by projecting the conversion chromaticity coordinate values obtained by converting each pixel of the input image by using the parameters onto the unit plane so that the additive color mixture can be performed, the parameter values in which the area of the color region becomes the maximum or the parameter values in which the barycenter at the time when the area of the color region is maximized is set to $\frac{1}{3}$ are obtained and the chromatic coordinate conversion is performed to the input image by using the obtained parameter values. Thus, since the degrees of the chromatic coordinate values of each pixel of the image data are not considered, even the image data obtained by photographing the object which is unbalanced in color arrangement can be converted into the image data obtained under the ideal white light source.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An image converting apparatus comprising:
   a parameter setting unit which sets parameters for converting chromaticity coordinate values of each pixel of an input image into conversion chromaticity coordinate values;
   a chromaticity coordinate converting unit which obtains conversion chromaticity coordinate values by converting each of said pixels on the basis of the parameters set by said parameter setting unit;
   a color region obtaining unit which normalizes the conversion chromaticity coordinate values and obtains a color region including 2-dimensional conversion chromaticity coordinate values of the normalized conversion chromaticity coordinate values by projecting each of said normalized conversion chromaticity coordinate values onto a unit plane so that an additive color mixture can be performed;
   a barycenter calculation processing unit which calculates a barycenter of said color region with respect to the parameters and obtains parameter values at the time when each coordinate of the calculated barycenter differs from a value of $\frac{1}{3}$ by less than a predetermined threshold; and
   an image converting unit which converts said input image on the basis of the obtained parameter values.

2. The apparatus according to claim 1, wherein said barycenter calculation processing unit obtains the parameter values at the time when each coordinate of the barycenter is set to $\frac{1}{3}$.

3. An image converting method comprising the steps of:
   using an image converting apparatus to set parameters for converting chromaticity coordinate values of each pixel of an input image into conversion chromaticity coordinate values;
   obtaining conversion chromaticity coordinate values by converting each of said pixels on the basis of the set parameters;
   normalizing the conversion chromaticity coordinate values and obtaining a color region including 2-dimensional conversion chromaticity coordinate values of the normalized conversion chromaticity coordinate values by projecting each of said normalized conversion chromaticity coordinate values onto a unit plane;
   calculating a barycenter of said color region with respect to the set parameters and obtaining parameter values at the time when each coordinate of the barycenter differs from $\frac{1}{3}$ by less than a predetermined threshold; and
   converting the input image using said obtained parameter values.

4. The method of claim 3, wherein the parameter values are obtained at the time when each coordinate of the barycenter is set to $\frac{1}{3}$.

* * * * *